United States Patent [19]

Metzinger

[11] Patent Number: 5,667,233
[45] Date of Patent: Sep. 16, 1997

[54] BICYCLE WITH A CHANGE-SPEED GEAR ARRANGEMENT

[76] Inventor: Arnold Metzinger, AM Hirthaus 1A, D-82239 Alling, Germany

[21] Appl. No.: 329,494

[22] Filed: Oct. 26, 1994

[30] Foreign Application Priority Data

Nov. 3, 1993 [DE] Germany ............................ 9316748 U

[51] Int. Cl.⁶ ................................................ B62M 11/06
[52] U.S. Cl. .................... 280/238; 280/212; 280/236; 280/260; 74/413
[58] Field of Search ..................................... 280/259, 260, 280/261, 236, 237, 238; 74/413, 423, 358, 360

[56] References Cited

U.S. PATENT DOCUMENTS

| | | | |
|---|---|---|---|
| 2,687,897 | 8/1954 | Wells | 280/260 |
| 4,170,369 | 10/1979 | Strutman . | |
| 4,283,069 | 8/1981 | Citelli | 280/236 |
| 4,469,343 | 9/1984 | Weatherford | 280/261 |
| 5,099,712 | 3/1992 | Douglass . | |
| 5,261,294 | 11/1993 | Ticer et al. | 280/260 |
| 5,486,015 | 1/1996 | Lau | 280/236 |

FOREIGN PATENT DOCUMENTS

| | | |
|---|---|---|
| 179 352 | 1/1954 | Austria . |
| 0 469 263 A2 | 2/1992 | European Pat. Off. . |
| 0 469 263 A3 | 2/1992 | European Pat. Off. . |
| 743 034 | 3/1933 | France . |
| 2 684 063 | 5/1993 | France . |
| 368 820 | 2/1923 | Germany . |
| 561 376 | 9/1932 | Germany . |
| 635 331 | 9/1936 | Germany . |
| 688 932 | 2/1940 | Germany . |
| 1 079 982 | 4/1960 | Germany . |
| 31 14 864 A1 | 12/1982 | Germany . |
| 8438112 U | 2/1985 | Germany . |
| 34 45 042 | 6/1986 | Germany . |
| 36 02 199 A1 | 7/1987 | Germany . |
| 36 14 716 C1 | 10/1987 | Germany . |
| 38 04 342 A1 | 8/1989 | Germany . |
| 41 34 843 A1 | 11/1992 | Germany . |
| 9300678 U | 6/1993 | Germany . |
| 9316531 U | 1/1994 | Germany . |
| 4-292291 | 10/1992 | Japan . |
| 191 128 | 5/1937 | Switzerland . |
| 191 395 | 6/1937 | Switzerland . |
| 986 682 | 3/1965 | United Kingdom . |
| 386 602 | 1/1993 | United Kingdom . |

*Primary Examiner*—Anne Marie Boehler
*Attorney, Agent, or Firm*—C. Dean Domingue

[57] ABSTRACT

Described is a bicycle with a gear arrangement in which drive force is transmitted from the pedal crank spindle to the rear wheel by way of a direction-changing transmission and a multi-stage shiftable main transmission. A common shaft serves as the driven shaft of the direction-changing transmission and the drive shaft of the main transmission. The transmission housing can be arranged substantially within the rear wheel hub and project therefrom only at the side at which the drive arrangement is disposed. The transmission housing is preferably connected to the bicycle frame by means of a single-sided mounting swing arm.

18 Claims, 7 Drawing Sheets

BICYCLE WITH A CHANGE-SPEED GEAR ARRANGEMENT

FIELD OF THE INVENTION

The present invention concerns a bicycle with a change-speed gear arrangement.

BACKGROUND OF THE INVENTION

Bicycles which are known at the present time, incorporating a change-speed gear arrangement, either have a hub-type gear arrangement or a chain-type gear arrangement, often referred to as a derailleur gear arrangement because the drive chain is shifted or 'derailed' from one sprocket to another, on a sprocket cluster having a multiplicity of sprockets.

The hub-type gear arrangement suffers from the disadvantage that the number of available gear ratios is greatly restricted. Although with increasing design development of such gear arrangements, it is now possible to design hub-type gear arrangements with up to seven gear ratios or shift stages, very complicated design configurations are then required in such an arrangement and the components which make up the assembly must accordingly be very small. A hub-type gear arrangement must more specifically always operate on the basis of the principle of a planetary transmission so that the same direction of rotation as between the chain sprocket and the wheel hub is maintained.

Hitherto the only possible way of providing a substantially larger number of shift stages or gear ratios has been the chain shift gear arrangement or derailleur gear. However such arrangements suffer from the disadvantage that, in spite of all the endeavours that have been made in terms of design configuration, even nowadays the chain can still easily jump off the chain sprockets, in particular when shifting from one gear to another. In addition although in theory the derailleur gear arrangement can provide a given number of gear ratios which is determined by the number of rear sprockets and the number of front chainwheels, it is in fact not possible to make use of all those theoretically available gear ratios as in same extreme situations the chain would then run at an excessively acutely extending line and that would inevitably result in the chain jumping off the sprockets or other major problems such as noise and lack of smoothness in transmission of the drive force by way of the chain, and severe chain wear. In addition the chain requires regular care, in the form of lubrication, and at the same time represents a possible source of fouling and damage in regard to the clothing of the cyclist.

SUMMARY OF THE INVENTION

An object of the present invention is to provide a bicycle having a change-speed gear arrangement, with which a very large number of gear ratios is possible without suffering from the disadvantages of a derailleur gear arrangement.

Another object of the present invention is to provide a change-speed gear arrangement for a bicycle, which is highly user-friendly and affords a high level of versatility in terms of gear ratios.

Still another object of the present invention is to provide a change-speed gear arrangement for a bicycle which is of a compact and generally self-contained construction of a simplified structure.

In accordance with the present invention the foregoing and other objects are achieved by a bicycle having a change-speed gear arrangement wherein the transmission of force from the pedal crank spindle to the rear wheel is by way of a direction-changing or reversing transmission means and a multi-stage shiftable main transmission means and a con, non shaft serves as the driven or output shaft of the direction-changing transmission means and as the drive shaft of the main transmission means.

Because of the simple design configuration involved, in accordance with a preferred feature of the invention, the main transmission means can be in the form of a spur gear-draw key shift arrangement, having spur gears and a shiftable key for producing the varying gear ratios. The use of the direction-changing transmission means and the main transmission means does in fact again provide for the correct direction of rotation of the transmission assembly overall, without the need to use the complicated structures of conventional hub-type gear arrangements, for example a planetary transmission means.

In order to provide the largest possible number of shift stages or gear ratios, in accordance with another preferred feature of the invention the direction-changing transmission means may also be in the form of a multi-stage shift transmission.

In that respect a preferred feature provides that the direction-changing transmission means is also in the form of a spur gear-draw key shift arrangement.

In a particularly preferred feature of the invention both the transmission means may be in the form of a spur gear-bell draw key shift arrangement.

As in accordance with the invention it is now no longer necessary for the gear transmission ratio from the pedal crank spindle to the hub of the rear wheel to be provided by means of a very large chain wheel on the pedal crank shaft and a comparatively very small chain sprocket on the rear wheel hub, it is now advantageously possible to manage without the chain drive which needs constant care and attention and which is unpopular because of the risk of fouling that it entails. Instead, in accordance with another preferred feature of the invention, the transmission of force from the pedal crank spindle to the rear wheel can be by way of a toothed belt and first and second belt pulleys which are of almost the same size, one of which is connected to the pedal crank spindle while the other is connected to the drive shaft of the direction-changing transmission means.

In accordance with another preferred feature of the invention, a further structural simplification in the rear wheel hub of the bicycle according to the invention can be achieved by the rear wheel of the bicycle being fixed directly on the driven or output shaft of the main transmission means so that at the same time that shaft forms the spindle of the rear wheel. It is then no longer necessary to provide a fixed or stationary rear wheel spindle.

It will be noted at this point that, when using the principles of the present invention, the freewheel device which is usually also required for a bicycle can be disposed at a very wide range of different locations, for example at the transition from the rear chain sprocket or the rear belt pulley to the drive shaft of the direction-changing transmission means. In accordance with a particularly preferred configuration however the spur gear set on the driven or output side of the assembly can be jointly rotatably mounted on the output or driven shaft of the main transmission means, in coaxial relationship therewith, with a freewheel device being disposed between the spur gear set and the driven output shaft.

In that arrangement, in regard to the design configuration involved, a particularly preferred feature provides that the freewheel device is arranged under the largest gear of the spur gear set of the driven output shaft.

As indicated above, previously known bicycle transmissions (hub-type gear arrangement or derailleur gear arrangement ) suffer from the disadvantage that they have to be regularly greased or oiled, which is a time-consuming, awkward and tedious task. If however such lubrication is not effected the known arrangements tend to suffer from a high level of power loss due to excessive friction. In accordance with a preferred feature of the invention therefore the direction-changing transmission means and the main transmission means may be combined together in a common, sealed, oil-filled transmission housing. That can ensure perfect lubrication. Care of the arrangement is substantially simplified as it is only necessary to change the transmission oil from time to time, which involves substantially less work than lubricating a chain or carrying out the appropriate maintenance operations on a hub-type gear arrangement.

From the point of view of structural configuration it is particularly preferred for the direction-changing transmission means to be arranged outside the rear wheel hub and for the main transmission means to be arranged within the rear wheel hub.

In a preferred feature of the bicycle according to the invention the connection between the rear wheel mounting and the bicycle frame can be embodied by a swing arm or pivoted fork, and even more preferably by means of a single-sided swing arm which thus has just a single arm pivotally mounted on the bicycle frame and extending only on one side of the rear wheel to the mounting thereof. That makes it possible for the bicycle to enjoy comfortable springing without having to involve a high level of structural expenditure. The transmission housing can then be arranged substantially within the wheel hub and it projects out of the wheel hub only at the side at which the drive assembly is provided, and it is then connected to the frame of the bicycle by means of the single-sided swing arm.

With that structure the brake device for the rear wheel can very advantageously be in the form of a disk brake. In that case, a brake disk is then fixed to the rear wheel hub on the side of the rear wheel swing arm, the brake disk co-operating with a brake caliper fixed to the swing arm.

If the arrangement is carefully and cleverly designed the main transmission means does not need the whole of the space available within the hub. In that case, a drum brake device can advantageously be disposed within the hub, beside the transmission housing, on the latter, and co-operates with the inside surface of the hub. That affords a brake device for the rear wheel, which, in contrast to the above-mentioned disk brake, is completely protected from the effects of weather and the like. In that arrangement brake actuation can also be effected by means of beck-pedalling, as in the case of conventional hub-type gear arrangements or backpedal or coaster brakes. The riding feel or sensation is then the same as with a conventional bicycle with a hub-type gear arrangement. There is no risk that, in a panic situation, the rider first pedals rearwardly, with no effect, as frequently happens when using a chain shift gear arrangement, before the rider then remembers again that it is in fact only possible to apply the brakes by operating hand levers.

In an advantageous feature of the invention the space available beside the main transmission means can also be used to provide there a generator for the lighting equipment of the bicycle. In that way it is possible to eliminate the dynamo which is designed to co-operate with the tire of a wheel, either the front wheel or the rear wheel, at a location where it is susceptible to damage and trouble. In that case a coil assembly is rotatably mounted within the hub, beside the transmission means housing, on the latter, coaxially relative to the hub, and arranged opposite the coil assembly on the hub are corresponding permanent magnets so that the coil assembly and the permanent magnets together form a self-excited electrical generator, wherein for switching on the generator there is provided a device for securing the coil assembly to the transmission means housing, and a current collector or pick-up device. In that way the generator in the arrangement according to the invention does not brake the wheel when no light is required. That is a major advantage in comparison with previously known hub-type dynamos, which, even when unloaded, by virtue of the pole action of the permanent magnets, exert a severe braking effect, which is naturally very unpleasant when riding a bicycle. In accordance with the present invention however the coil assembly rotates with the hub and is stopped only when power has to be produced to light the lights. That therefore eliminates the continuous braking effect of the previously known hub dynamo, which can produce a considerable amount of drag.

For transmission of the current from the coil assembly which in the idle condition also rotates with the hub to the stationary transmission means housing, the assembly may have a current collector or pick-up means in the form of a spring slip brush member which runs on a slip ring which is fixed to the housing. That arrangement also enjoys the advantage that the coil assembly is held fast relative to the housing when current is being taken off. The current pick-up device is therefore only loaded while it is stationary. An electrical load while moving does not occur. Accordingly the current pick-up means can be of a substantially smaller configuration.

In addition, in a particularly preferred feature, the current pick-up means and the means for securing or retaining the coil assembly can be combined in such a way that the coil assembly is secured and at the same time a suitable electrical contact is produced. For that purpose, the current pick-up means and the means for securing the coil assembly comprise a projection or nose of electrically conductive material on the coil assembly and an electrically conductive arm which is insulatedly mounted on the transmission means housing and which is pivotable into a position in which it secures the coil assembly and at the same time serves as a conductor to carry off the current produced.

It is also possible in accordance with the invention to use a separately excited generator. That also has the advantageous that in the idle or inoperative condition it does not exert any braking action on the bicycle. Such a separately excited generator is preferably used when the bicycle is to be equipped with a proper lighting arrangement in which a battery or accumulator is included so that the lights can also be lit when the bicycle is stationary. In that case, disposed within the hub beside the transmission means housing and on the latter is a coil assembly disposed in coaxial relationship with the hub while disposed opposite the coil assembly on the hub is a suitable further coil assembly so that the two coil assemblies together form a separatedly excited electrical generator, the arrangement including a current transfer means by way of which the further coil assembly is supplied with excitation current. Such a generator affords the advantage that, when the bicycle has a lighting arrangement which has battery hack-up, the generator can be switched on only when going down hills and when the brakes are applied, that is to say when a braking effect is desired in any case. While the bicycle is travelling under other circumstances the braking action of the dynamo, which is otherwise usually produced, is undesirable in any case, but the current required for lighting the lamps can be covered by use of the battery, during such an operating condition.

In addition the space available within the hub can also be utilized to mount an electrical hub motor within same beside the transmission means housing on the latter. In that way an electrical auxiliary motor can be inconspicuously integrated into the bicycle hub. It is at that position that such a motor is best protected from damage and does not cause trouble.

Further objects, features and advantages of the present invention will be apparent from the following description of preferred embodiments.

DESCRIPTION OF PREFERRED EMBODIMENTS

Figure 1:
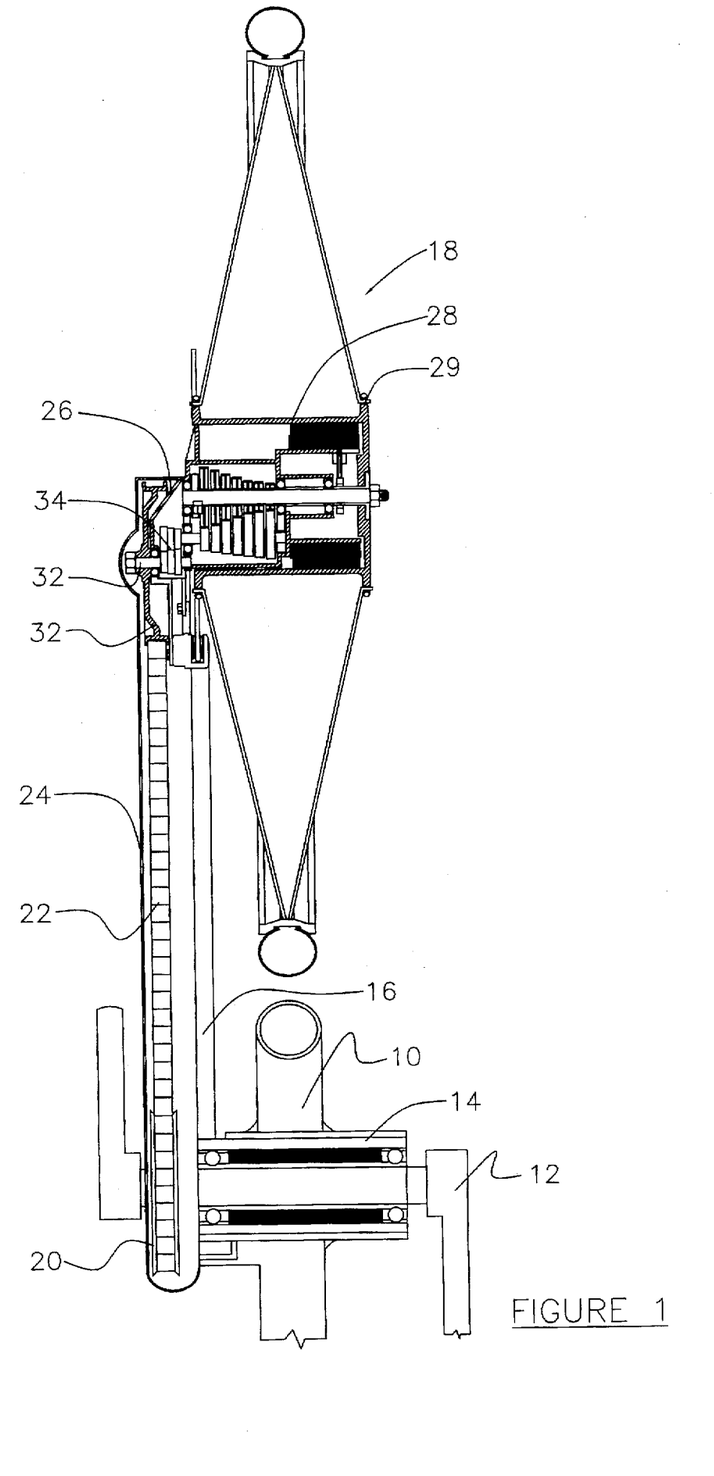
FIG. 1 is a plan view in section of the entire power transmission line from the pedal crank spindle to the rear wheel, with the corresponding rear wheel suspension assembly.

Referring firstly to FIG. 1, shown therein is the entire drive train of a bicycle according to the invention and a preferred form of suspension assembly for the rear wheel thereof, in the form of a single-sided swing arm. Looking more particularly at FIG. 1 reference numeral 10 identifies part of a bicycle frame, more specifically in the lower region thereof at which a pedal crank assembly including a pedal crank 12 is rotatably mounted by suitable bearings supporting the pedal crank spindle. The bearing arrangement for supporting the pedal cranks is coaxially enclosed by a further bearing arrangement 14 for pivotably supporting a single-sided swing arm 16. The rear wheel 18 is suspended on the single-sided swing arm 16 at the end thereof remote from the pedal crank assembly. Instead of the conventional chainwheel, at the side at which the single-sided swing arm extends, the pedal crank 12 carries a belt pulley 20 for a toothed belt 22, disposed outside the single-sided swing arm 16. The toothed belt 22 is completely enclosed by a casing 24. At its rearward end the single-sided swing arm 16 carries a transmission housing 26 on which a hub 28 of the rear wheel 18 is mounted. The transmission housing 26 extends partially into the rear wheel hub 28. The toothed belt 22 drives a belt pulley 30 which is fixed on the drive shaft 32, which can also be seen in greater detail for example in FIG. 2, of a direction-changing transmission means 34. The transmission means 34 is disposed in the transmission housing 26 and the drive shaft 32 of the transmission means 34 is supported by a ball bearing arrangement in the transmission housing 26, as can be clearly seen for example from FIG. 2. The usual fixing devices 29 for the spokes of the rear wheel are provided on the hub 28 of the rear wheel.

The two toothed belt pulleys 20 and 30 are preferably of at least almost the same size. The toothed belt and the co-operating pulleys are completely enclosed by the casing 24.

Reference will now be made to FIGS. 2 through 5 to illustrate individual alternative configurations according to the invention of the transmission means and additional units in the rear wheel hub.

Figure 2:
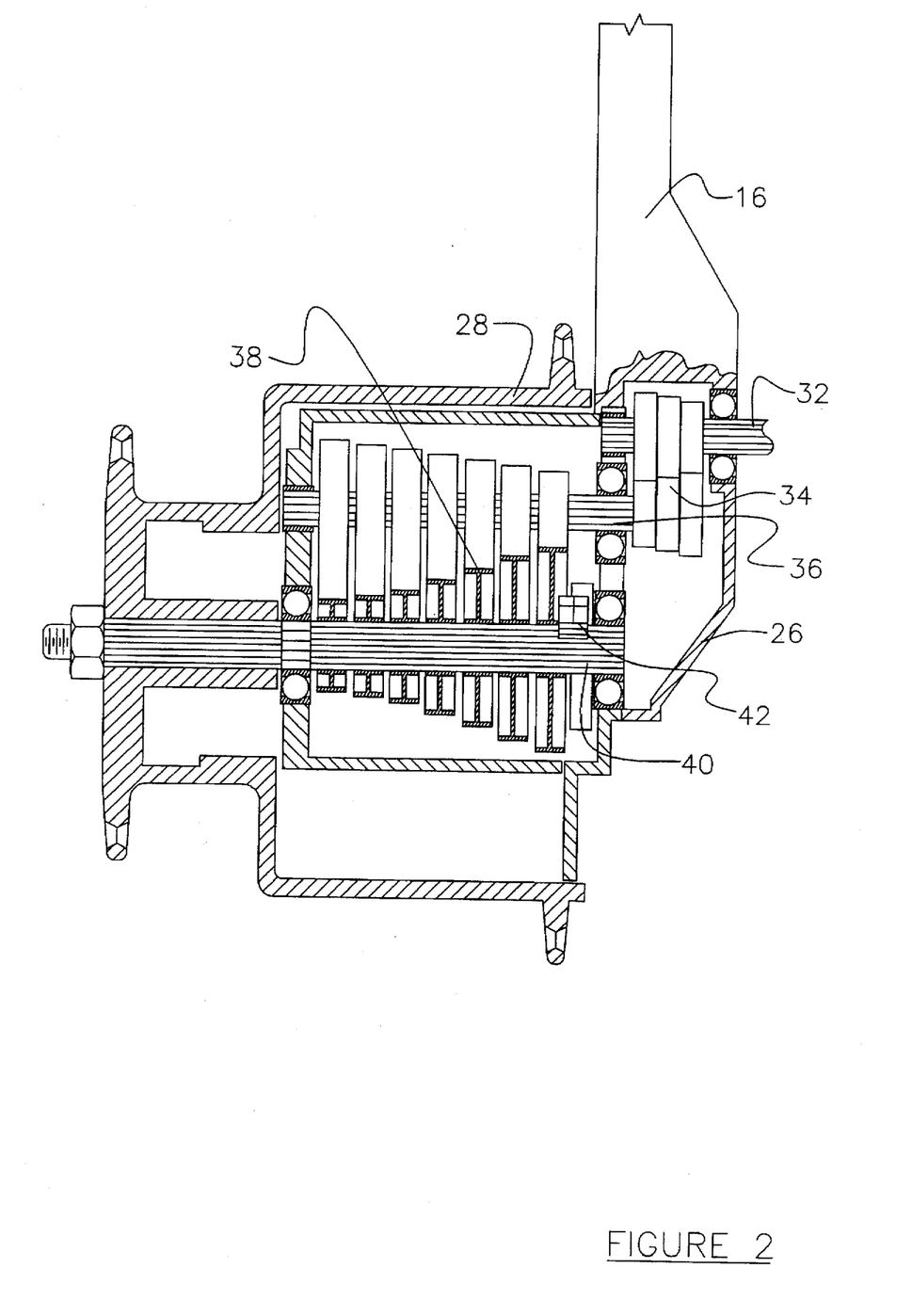
FIG. 2 is a plan view in partial section of an embodiment of a rear wheel hub and the mounting thereof on a single-sided swing arm for a bicycle according to the invention.

Looking therefore firstly at FIG. 2, shown therein is a simple embodiment of the bicycle transmission according to the invention. Shown in FIG. 2 is part of the single-sided swing arm 16 which carries the transmission housing 26. The transmission housing 26 extends into the hub 28 of the rear wheel 18.

At the side of the hub at which the single-sided swing arm 16 is disposed, the drive shaft 32 for the transmission means 34 extends outwardly from the hub. FIG. 2 does not show whether a belt pulley or a conventional chain sprocket is mounted on the drive shaft 32 of the transmission means 34. While FIG. 1 shows the bicycle transmission according to the invention used in connection with a belt drive, it will be appreciated that the advantages of the bicycle transmission according to the invention can also be used in part in connection with a conventional chain drive for the rear wheel.

In FIG. 2 the transmission means 34 is shown in the form of a three-stage spur gear ball draw key transmission which can thus afford three different gear ratios. For the sake of simplicity of the drawing the Bowden cable assembly required for actuation of the transmission means has been omitted, and similarly in regard to the Bowden cable assembly required for actuation of the main transmission means 38, as will be described below.

It will be appreciated that the transmission means 34 may have a greater or larger number of shift stages or gear ratios than that illustrated. In particular it may also be in the form of a non-shiftable simple direction-changing transmission means if there is no need for a plurality of different gear ratios to be afforded thereby.

It will be seen from FIG. 2 that the driven or output shaft 36 of the transmission means 34 at the same time forms the input or drive shaft of the main transmission means 38. The main transmission means 38 in this embodiment is in the form of a seven-stage or seven-ratio spur gear-draw key transmission, with the shift action taking place at the drive side. It will be appreciated that a larger or smaller number of gear ratios may be provided with this transmission means.

The spur gear set which is disposed at the output or driven side of the main transmission means 38 is rotatably mounted on the output or driven shaft 40 of the main transmission means 38, coaxially with respect thereto. The connection between that spur gear set and the driven shaft 40 of the main transmission means 38, to provide for the transmission of force therebetween, is made by way of a conventional freewheel device which is diagrammatically illustrated at 42 in FIG. 2 and which is arranged under the largest gear of said spur gear set.

In the illustrated embodiment the driven shaft 40 at the same time represents the rotating wheel spindle for the rear wheel 18.

In the embodiment shown in FIG. 2 the transmission housing 26 is in the form of a sealed, oil-filled transmission housing and thus encloses the transmission means 34 and the main transmission means 38. The arrangement in this embodiment is so selected that the transmission means 34 is disposed outside the wheel hub 28, at the level of the single-sided swing arm 16, while the main transmission means 38 is disposed within the wheel hub 28.

Figure 3:
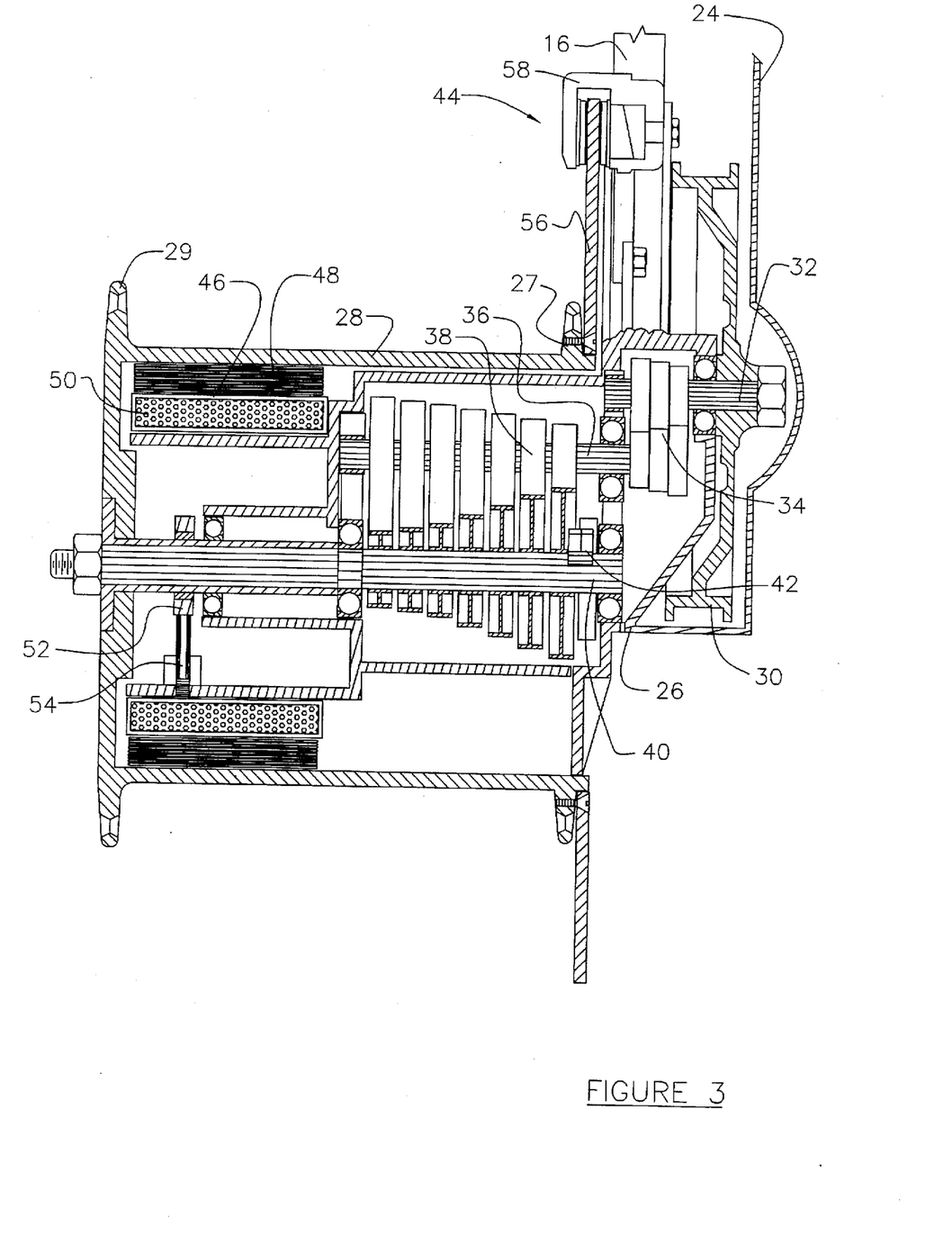
FIG. 3 is a plan view in section of an embodiment of a rear wheel hub for a bicycle according to the invention with shift transmission means, a separately excited electrical generator integrated in the hub, a disk brake and a belt pulley.

Reference will now be made to FIG. 3 showing a further embodiment according to the invention. The structure shown in FIG. 3 generally corresponds to that shown in FIG. 2, except that it additionally includes a disk brake arrangement generally identified by reference numeral 44 and a separately excited generator generally identified by reference numeral 46.

FIG. 3 shows the rear belt pulley 30 for the toothed belt drive and the casing 24 thereof on a larger scale. The casing 24 for the toothed belt 22 terminates here directly with the outside of the transmission housing 26.

FIG. 3 shows the way in which the additional space which remains in the hub beside the main transmission means 38 can be put to use. Disposed here is a separately excited electrical generator 46 comprising a coil assembly 48 which is arranged coaxially on the inside of the hub. Disposed opposite the coil assembly in coaxial relationship are corresponding coils 50 which are fixed to the transmission housing 26 which extends into the rear wheel hub. For current transmission purposes, fixed to the shaft 40 of the main transmission 38 is a slip ring 52 which co-operates with a spring slip member or carbon brush 54 which is fixed to the transmission housing 26.

The disk brake arrangement 44 is designed in such a way that a brake disk 56 is connected to the wheel hub 28 outside the fixing devices 29 for fixing the spokes of the wheel to the hub 28, on the side of the hub which is towards the single-sided swing arm 16. The brake disk 56 is embraced by a brake caliper 58 which is suitably mounted on the single-sided swing arm 16. In that respect the brake caliper 58 is of the usual design configuration to be found in disk brakes. The brake can be actuated either hydraulically or by way of a Bowden cable arrangement.

Figure 4:
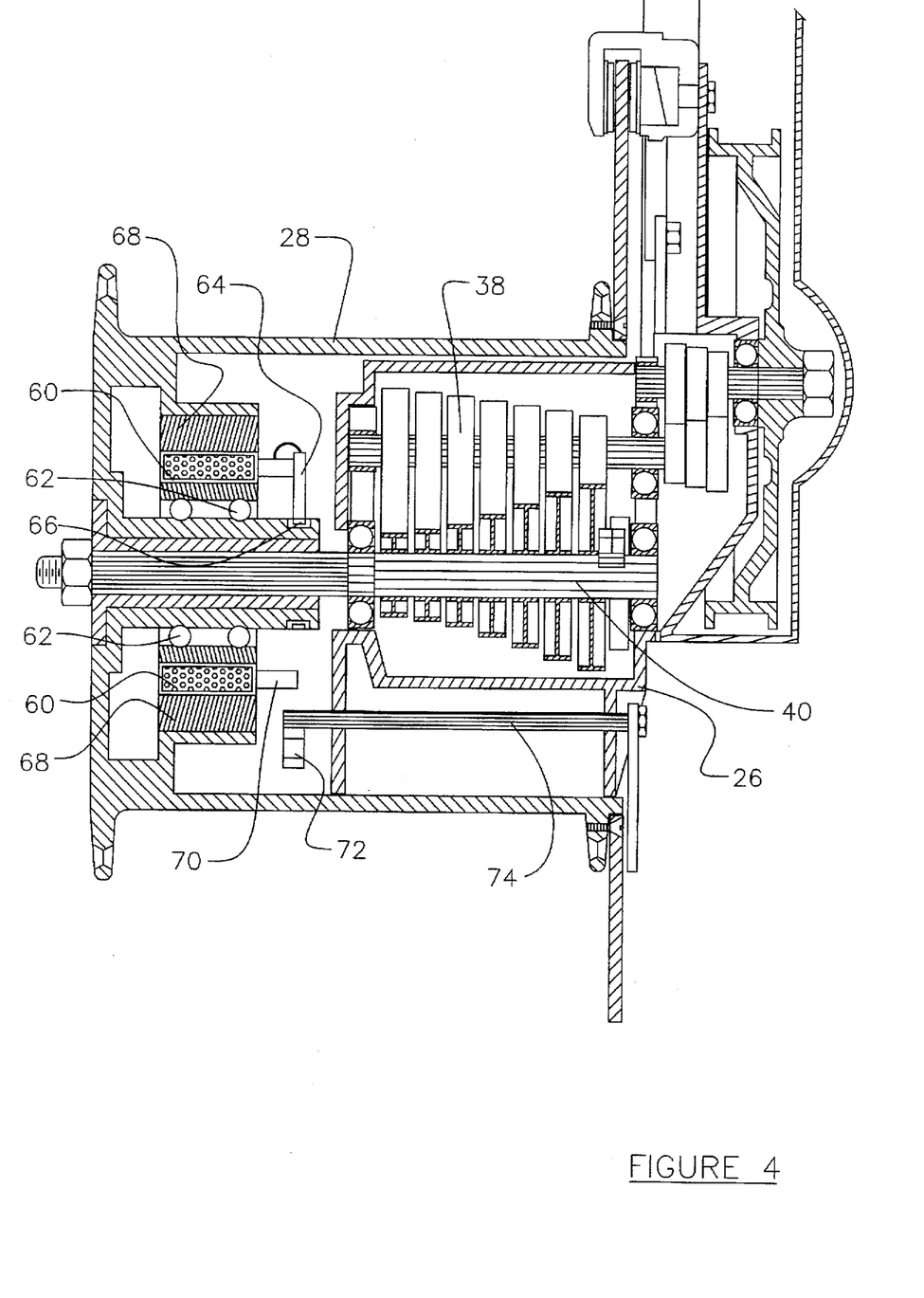
FIG. 4 is a view corresponding to that shown in FIG. 3 of a structure generally corresponding to that shown in FIG. 3 but with a self-excited generator.

Referring now to FIG. 4, shown therein is a further embodiment of the invention which also includes a self-excited generator. For that purpose coils 60 are coaxially rotatably mounted by means of ball bearing assemblies 62 on the output shaft 40 of the main transmission means 38. For taking off the current produced, the arrangement has a spring slip member or carbon brush 64 co-operating with a slip ring 66 which is fixed to the transmission housing 26 in insulated relationship therewith. Permanent magnets 68 are arranged opposite the coils 60 in coaxial relationship.

Mounted on the coils 60 is a nose or projection as indicated at 70. In the idle condition as illustrated here, the coils 60 rotate with the wheel hub 28 on the bearing arrangements 62 due to the eddy current effect which is produced by the poles of the magnets 68. There is practically no braking effect applied to the wheel, in that condition. If the lighting equipment is to be brought into operation, the coils have to be secured relative to the hub and the projection 70 serves for that purpose. It can be secured by an arm 72 which is pivotable into its path of rotary movement. For that purpose the arm 72 is fixed on a shaft 74 which is mounted rotatably in the transmission housing 26. The shaft 74 can then be actuated by the rider, by means of a lever which is mounted externally on the transmission housing or by means of a Bowden cable arrangement, from the handlebars. That also makes it a considerably more convenient and comfortable operation, for switching the lighting on and off. Hitherto in fact a dynamo had to be pivoted into contact with the tire on a wheel or pivoted away from same, for bringing the lighting into and taking it out of operation.

It is also possible to forego the spring slip members or carbon brushes 64 and the slip ring 66 by the shaft 74 being mounted in an electrically insulated relationship and by the projection 70, the arm 72 and the shaft 74 being made from electrically conductive material. In that case the current can be taken off by way of the shaft 74. In accordance with the invention in fact current can be taken off only when the coils 60 are in any case fixed relative to the transmission housing 26 by the arm 72.

Figure 5:
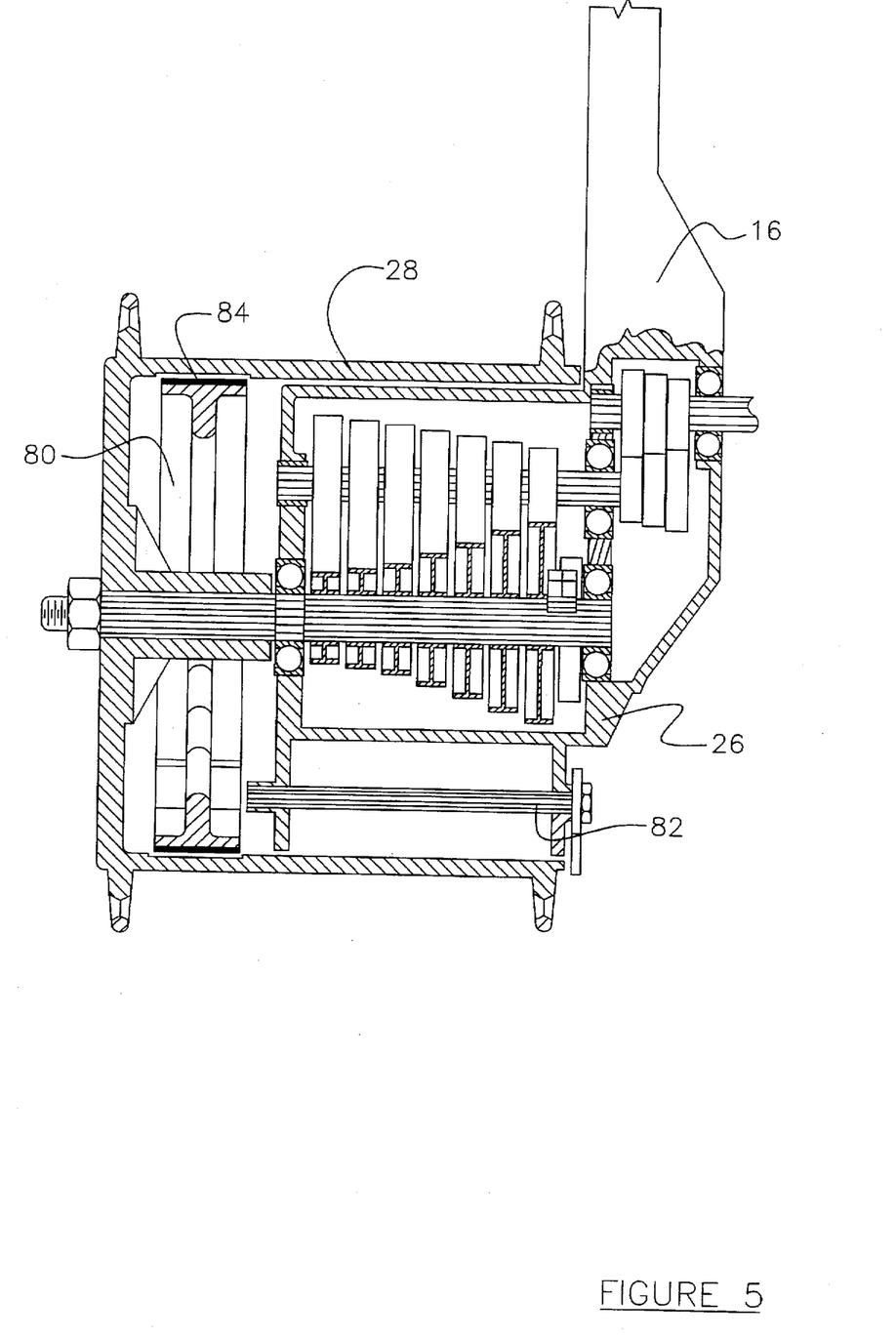
FIG. 5 shows an embodiment of a rear wheel hub for the bicycle according to the invention with an integrated drum brake.

FIG. 5 shows a further embodiment of the transmission for the bicycle according to the invention, in which the space remaining in the hub is used to dispose therein a drum brake arrangement. In that arrangement the brake shoes 80 are mounted on the transmission housing 26 and the brake is actuated by way of a shaft 82 which is mounting rotatably in the transmission housing 26. Brake linings are disposed on the brake shoes 80 in the usual manner, as indicated at 84. The brake linings 84 on the brake shoes 80 co-operate with the inside surface of the hub 28 which therefore here serves at the same time as a brake drum. With this arrangement the brake can be actuated by way of a Bowden cable assembly from the handlebars. It will be appreciated however that the brake can also be actuated by a back pedal action.

Figure 6:
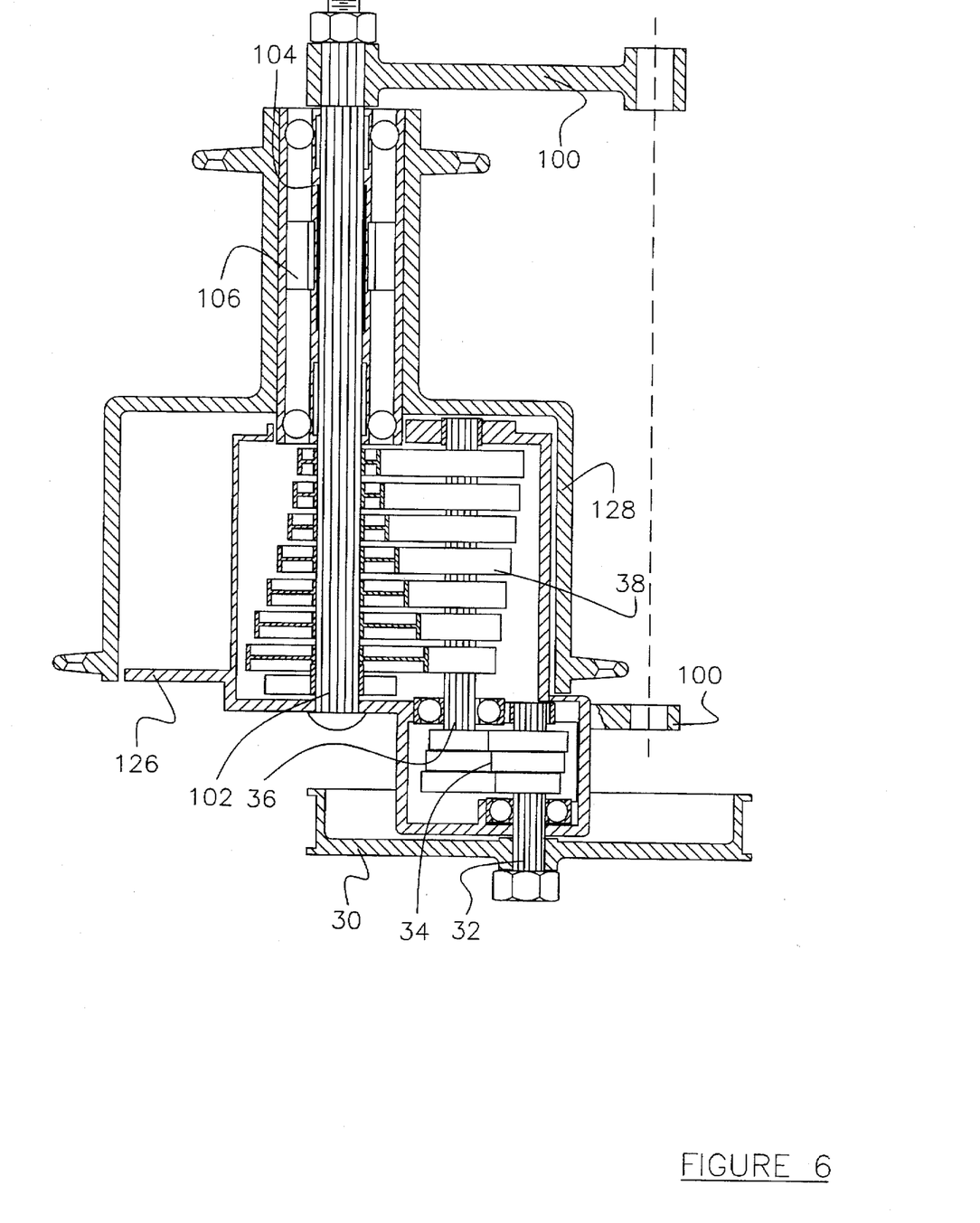
FIG. 6 is a plan view in section of the rear wheel hub of a bicycle according to the invention with conventional fixing of the rear wheel with a stationary rear wheel axle.

Finally FIG. 6 shows an embodiment in which the transmission according to the invention can be used in conjunction with a conventional bicycle frame design. In this case a rear fork as diagrammatically indicated at 100 embraces the rear wheel at both sides thereof and carries the transmission housing 126. In this case also however the drive is by way of a toothed belt and accordingly a toothed belt pulley 30 is disposed on the drive shaft 32 of the direction-changing transmission 34. In this case also the drive output of the transmission means 34 and the drive input of the main transmission means 38 are effected by way of a common shaft 36. As however the conventional bicycle design structure means that the arrangement must have a fixed or stationary rear wheel spindle 102 which connects the two ends of the rear wheel fork 100, the rest of the design configuration of the transmission means 38 is somewhat different.

On the side of the toothed belt drive the transmission housing 126 is connected to the rear wheel fork 100 and carries the rear wheel spindle 102 which is fixed therein. The spindle 102 is carried on the opposite side by the oppositely disposed end of the rear wheel fork 100. The spur gear set which is on the drive output side of the main transmission means 38 is here coaxially rotatably mounted on the fixed rear wheel spindle 102 and is extended in a hollow shaft 104 which is fixedly connected to the spur gear set. The hollow shaft 104 is also rotatably mounted on the rear wheel spindle 102. The transmission of force from the hollow shaft 104 to the rear wheel hub 128 is by way of a freewheel device diagrammatically indicated at 106.

In contrast to the embodiments shown in FIGS. 1 through 5, in FIG. 6 the rear wheel hub 128 is also open at the side which is opposite to the drive side. More specifically, the rear wheel spindle 102 projects out of the hub at the side remote from the drive side.

Figure 7:
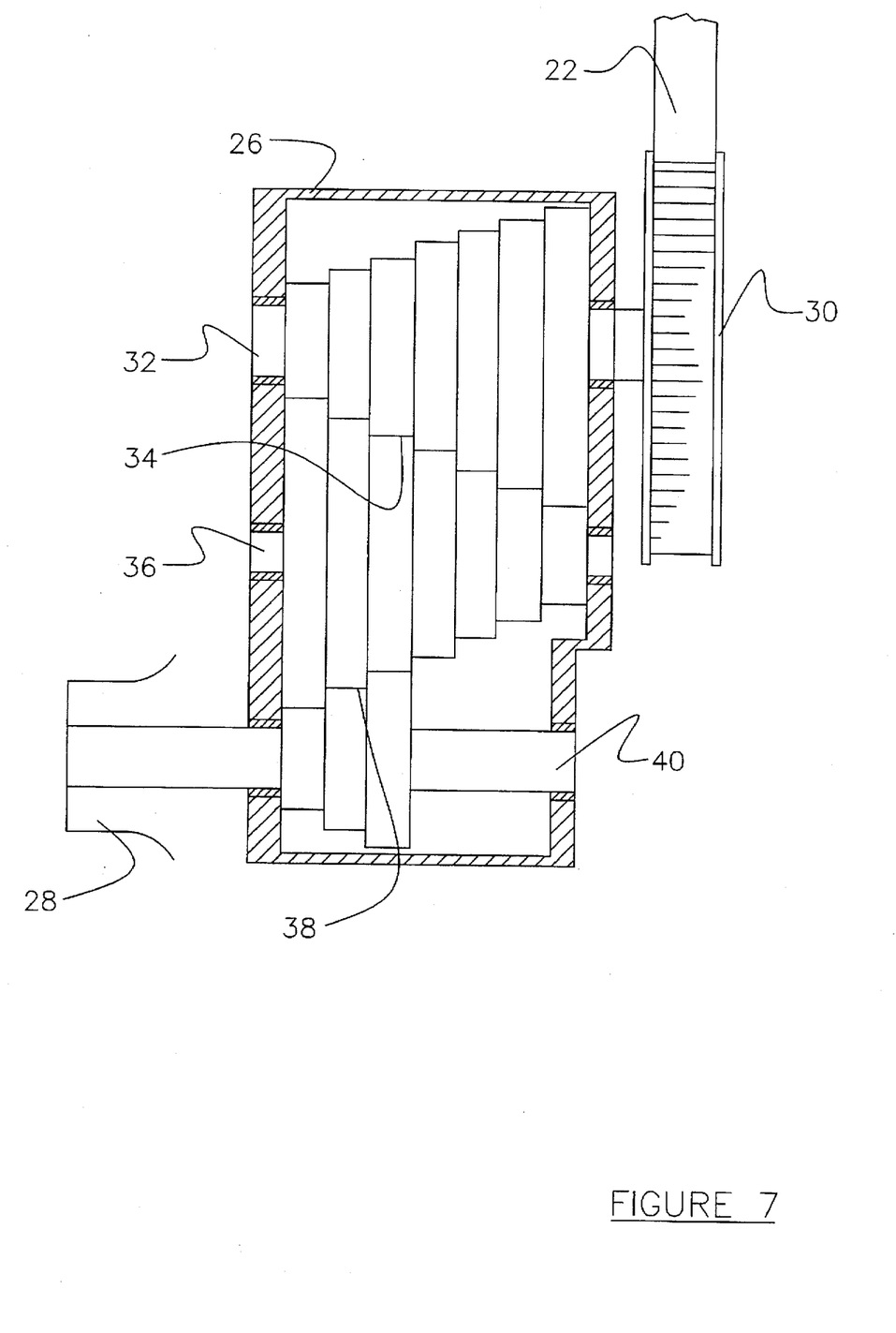
FIG. 7 is a plan view in section of an extremely miniaturized change-speed gear arrangement according to the invention.

It will be noted that, with the arrangement shown in FIG. 6, it is possible for already existing bicycles and bicycle frames also to be subsequently fitted with the transmission assembly according to the invention and if required also with the toothed belt drive according to the invention. FIG. 7 shows a further preferred embodiment of a gear arrangement according to the invention. Therein, a further miniaturization of the gear arrangement has been achieved, so that also a considerable reduction in the weight of the device had been achieved. In this case, the belt pulley 30 also drives the drive shaft 32 of the transmission means 34. The changing of the gears of the transmission means 34 is in this case achieved by selectively coupling of the single gear wheels arranged on the drive shaft 32 of the transmission means 34. In this case seven gear wheels and thus seven different gear ratios are already provided in the first transmission stage. All these gear wheels of the first transmission stage mesh with the seven gear wheels which are fixed on the second shaft 36 of the first gear means. The second or main transmission means 38 is in this case provided with only three transmission ratios. These can be obtained with three gear wheels, which mesh with the biggest gear wheels on shaft 36. For shifting the gears of the main transmission means 38, these gear wheels were selectively coupled with the driven shaft 40. On this driven shaft 40, also the rear wheel hub 28 is fixed. With the embodiment as shown in FIG. 7, 21 different transmission ratios can be obtained. If it is desired, however, also the second (main) transmission means can be provided with further seven transmission ratios, by simply adding further gear wheels on the driven shaft 40 which also can be selectively coupled with the driven shaft 40. In this way, it is possible to obtain up to seven times seven—49 different transmission ratios, which are really available compared with the chain shift gear arrangement, in which a lot of theoretical transmission ratios are not available due to problems with the running angle of the chain. In the transmission means according to the invention, there are no problems with this running angle of the chain.

It will be appreciated that the above-described embodiments of the present invention have been set forth solely by way of example and illustration of the principles thereof and that various modifications and alterations may be made therein without thereby departing from the spirit and scope of the present invention.

What is claimed is:

1. A bicycle containing a pedal crank spindle and a rear wheel, said bicycle having a change-speed gear arrangement and wherein the transmission of power from the pedal crank spindle to the rear wheel is by way of a first direction-changing transmission assembly operatively associated with a drive shaft and a second multi-stage shiftable main transmission assembly operatively associated with the drive shaft, and wherein a common shaft serves as the drive shaft of the first transmission assembly and as the drive shaft of the main transmission assembly and wherein the main transmission assembly is in the form of a spur gear-draw key shift arrangement.

2. A bicycle as set forth in claim 1 wherein said first transmission assembly is disposed outside the rear wheel hub and the main transmission assembly is disposed within the rear wheel hub.

3. A bicycle as set forth in claim 1 wherein the first direct changing transmission assembly is also in the form of a multi-stage shift transmission assembly operatively associated with said first direct changing transmission assembly.

4. A bicycle as set forth in claim 3 wherein the first transmission assembly is in the form of a spur gear-draw key shift arrangement.

5. A bicycle as set forth in claim 4 wherein the first and second transmission assembly are each in the form of a spur gear-ball draw key shift arrangement.

6. A bicycle as set forth in claim 1 wherein the transmission of force from the pedal crank spindle to the rear wheel is by way of a toothed belt and first and second belt pulleys of at least almost equal size, one said belt pulley being connected to the pedal crank spindle and the other being connected to the drive shaft of said first transmission assembly.

7. A bicycle as set forth in claim 1 wherein the rear wheel is fixed directly on the drive shaft of the main transmission assembly so that at the same time said driven shaft forms the spindle of the rear wheel.

8. A bicycle as set forth in claim 7 wherein the spur gear-draw key shift arrangement on a drive output side of the main transmission assembly is rotatably mounted on the driven shaft of the main transmission assembly coaxially with respect thereto, and further including a freewheel member operatively disposed between said spur gear set and said output shaft of said main transmission assembly.

9. A bicycle as set forth in claim 8 wherein said spur gear draw key shift arrangement contains a first gear and a second gear and wherein said first gear is larger than said second gear, and wherein said freewheel member is disposed under the first gear of said spur gear-draw key shift arrangement of said main transmission assembly.

10. A bicycle as set forth in claim 7 wherein said bicycle has a wheel hub, and further including a sealed oil-fillable transmission housing enclosing said first and second transmission assembly and wherein said transmission housing is arranged substantially within the wheel hub and projects out of the wheel hub only at the side at which the drive is provided and is connected to the bicycle by means of a single-sided swing arm.

11. A bicycle as set forth in claim 10 including a brake disk fixed to the hub on the side towards the swing arm and co-operable with a brake caliper fixed on the swing arm, to constitute a disk brake.

12. A bicycle as set forth in claim 7 wherein a drum brake means is disposed within the hub beside the transmission housing on same and co-operates with the inside surface of the hub.

13. A bicycle as set forth in claim 7 wherein a coil means is rotatably mounted within the hub beside the transmission housing on the transmission housing coaxially with respect, to the hub and corresponding permanent magnets are arrange opposite the coil means on the hub so that the coil means and the permanent magnets together form a self-excited electrical generator, wherein for switching on the generator there is provided a means for securing the coil means to the transmission housing, and a current pick-up means.

14. A bicycle as set forth in claim 13 wherein said current pick-up means is in the form of a spring slip brush member running on a slip ring fixed to said housing.

15. A bicycle as set forth in claim 13 said current pick-up means and said means for securing said coil means comprise a projection of electrically conductive material on said coil means and an electrically conductive arm which is mounted in insulated relationship on the transmission housing and which is adapted to pivot into a position in which it secures said coil means and serves at the same time to carry off the electric current generated.

16. A bicycle as set forth in claim 7, said bicycle containing a hub and a transmission housing associated with said hub, wherein a first coil assembly is mounted within the hub on the transmission housing coaxially with respect to the hub and a second coil assembly is arranged opposite the first coil assembly on, the hub so that the first and second coil assembly together form a separately excited electrical generator, and further including a current transmission means for supplying the second coil assembly with excitation current.

17. A bicycle as set forth in claim 7 wherein an electrical auxiliary motor is mounted within the hub beside the transmission housing on the transmission housing.

18. A bicycle as set forth in claim 1 and further including a common sealed oil-fillable transmission housing for jointly enclosing said first and second transmission assembly.

* * * * *